United States Patent [19]

Lee et al.

[11] 3,782,683

[45] Jan. 1, 1974

[54] PIPE COUPLINGS

[75] Inventors: Dennis D. Lee, Oskaloosa, Iowa;
Robert F. Gilchrist, Wichita Falls, Tex.

[73] Assignee: Clow Corporation, Oak Brook, Ill.

[22] Filed: Jan. 23, 1973

[21] Appl. No.: 326,050

[52] U.S. Cl............... 251/148, 285/16, 285/177, 285/337
[51] Int. Cl............................................. F16l 17/00
[58] Field of Search................. 251/148, 152, 150, 251/151; 285/15, 16, 177, 231, 331, 337; 137/315

[56] References Cited
UNITED STATES PATENTS

| | | | |
|---|---|---|---|
| 2,288,904 | 7/1942 | Hudson | 285/337 X |
| 3,288,495 | 11/1966 | Newell et al. | 285/337 X |
| 3,547,471 | 12/1970 | Dunmire | 285/337 |
| 3,594,023 | 7/1971 | Yano | 285/337 |
| 3,610,666 | 10/1971 | Tyler | 285/337 |
| 3,638,907 | 2/1972 | Graham et al. | 251/148 |

*Primary Examiner*—William R. Cline
*Attorney*—William E. Anderson et al.

[57] ABSTRACT

A highly versatile pipe coupling which is especially useful in connecting or repairing two ends of pipe that are not coaxially aligned. Bushings allow the same coupling components to connect pipe of different material and wall thickness.

10 Claims, 4 Drawing Figures

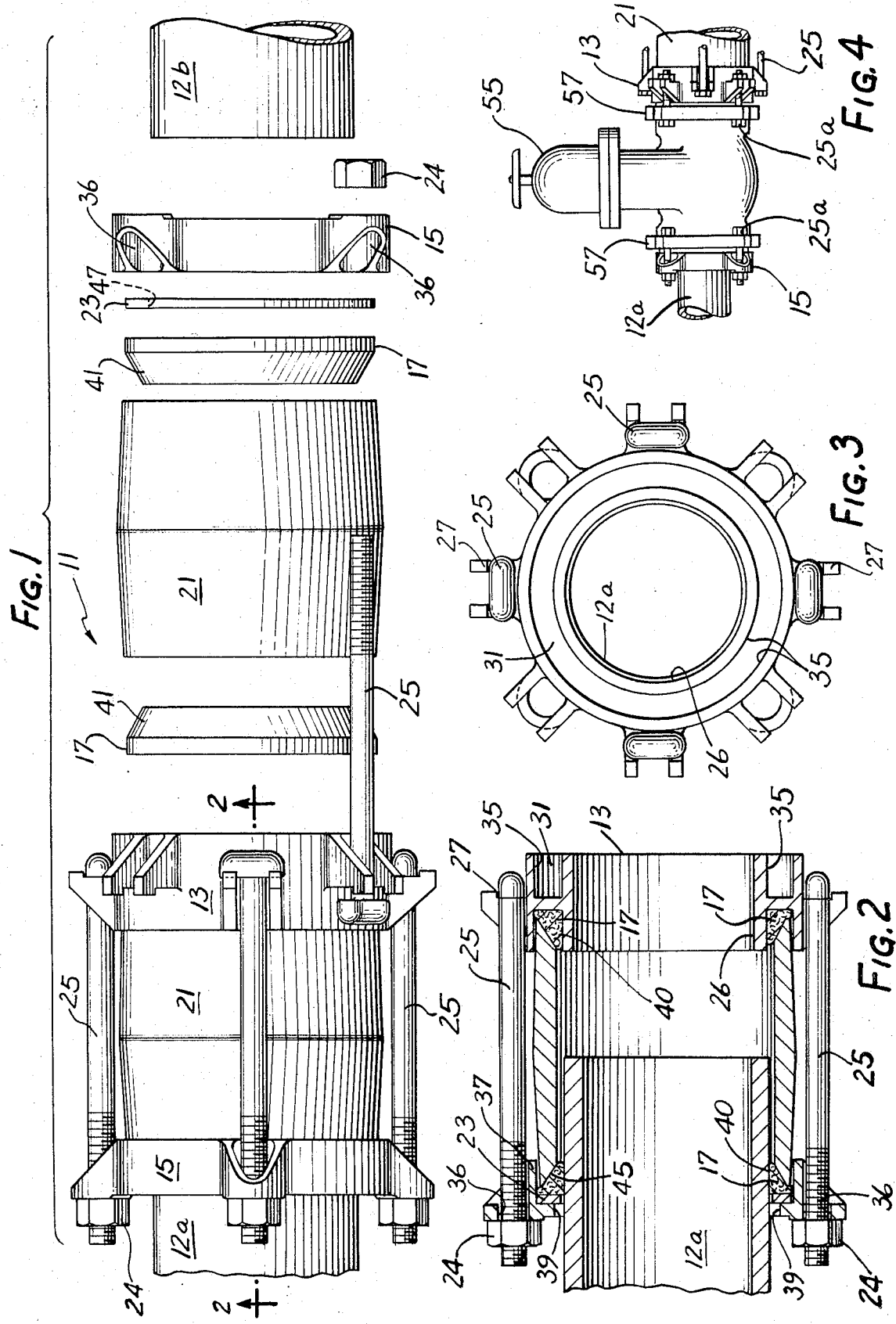

PIPE COUPLINGS

The present invention relates to pipe couplings and particularly to pipe couplings used to repair a broken pipe or whenever two spaced apart ends of pipe are to be connected.

When repairing a broken pipe it is common practice to cut away the section of the pipe which is cracked or leaks and connect the resulting two pipe ends by an appropriate pipe coupling. Generally a pipe coupling will comprise a sleeve, two deformable gaskets, two pressure plates and means to connect the two pressure plates. Typically, to install a pipe coupling a deformable gasket and a pressure plate are placed around one pipe end. A sleeve is then mounted on that pipe end and a pressure plate and gasket are mounted on the other pipe end. The sleeve is then moved to overlay both pipe ends. Connectors, usually bolts, are utilized to draw the two pressure plates together and fix them in place; the pressure plates squeezing the deformable gasket between the inner wall of the sleeve and the outer wall of the pipe thereby forming a fluid tight connection between the sleeve and the pipe. When the coupling has achieved a fluid tight connection on both ends of the sleeve, the repair is completed.

Such a coupling is most effective if the pipe ends are coaxially aligned. If the pipe ends are not aligned the tension drawing the two pressure plates together will not be acting uniformly about at least one of the pipe ends. Thus the deformable gasket may become skewed on one of the pipe ends making a fluid tight seal very hard to achieve.

The pressure plates should fit closely about each pipe section and squeeze the deformable gasket between the sleeve and the pipe surface without extruding the gasket out between the pressure plate and the pipe; thus the pressure plates should have an inner diameter approximating the pipe outer diameter. Generally the inner diameter of the pipe is known, i.e., it will be known that a 4-inch pipe is to be repaired. However, the outer diameter of the pipe to be repaired is not always known, and this is the critical dimension for a pipe coupling. Various makes and compositions of pipes, although they all have the appropriate specified inner diameter, may have significantly varying outer diameters. For example, an asbestos cement 4-inch pipe will have a significantly greater outer diameter than a cast iron 4-inch pipe. The situation where the pipe outer diameter is unknown often occurs when the repairman must dig into the ground to find and repair the broken pipe. In such a situation, the exact length of the defective portion of the pipe cannot be ascertained beforehand, and this further complicates the repair work.

Additionally, in some instances the repairman may be required to place a shut-off valve in the line, which would require a set of coupling components particularly suitable for use in the installation of such a shut-off valve. Thus, a potentially large number of parts must be carried by the repairman, e.g., different lengths of sleeves and different sized pressure plates, so that he will be able to handle the various contingencies which may develop when effecting the repair of pipe.

It is the primary object of the present invention to provide an improved pipe coupling.

It is another object of the invention to provide a pipe coupling of greater versatility than the pipe couplings of the prior art.

It is a further object of the invention to provide a pipe coupling which may be used on varying sized pipes without the necessity of utilizing different sized major components.

It is still another object of the invention to provide a pipe coupling which may be used to repair various lengths of broken pipe.

It is yet another object of the invention to provide a pipe coupling which may be used to place a shut-off valve in a fluid delivery line.

These and other objects of the invention will become apparent upon reading the following detailed description in conjunction with the accompanying drawings wherein:

FIG. 1 is an elevation view of a pipe coupling embodying various features of the present invention, shown mounted on one end of a pipe, with one-half of the pipe coupling being shown in exploded condition;

FIG. 2 is a section view of the pipe coupling of FIG. 1 taken along lines 2—2;

FIG. 3 is a right hand end view of the pipe coupling portion illustrated in FIG. 2; and, FIG. 4 is a front elevation view of an alternative embodiment of a pipe coupling shown interconnecting a shut-off valve.

Illustrated in FIG. 1 is a pipe coupling 11 which is adapted to join a pipe 12a to a pipe 12b and which generally includes a double-faced gland 13, two single-faced glands 15, four deformable gaskets 17, two extension sleeves 21, two bushings 23, which are optional, and eight bolts 25 and nuts 24.

The double-faced gland 13 is a short sleeve (see FIG. 2.) having a central circular passageway 26 which has a diameter about equal to that of the pipe being repaired, and it has eight bolt mounting holes 27 spaced equal distances apart about its circumference. It should be understood that the number of apertures 27 and bolts 25 may vary with the size of the pipe being coupled, and the eight which are shown are only illustrative. Four bolt mounting apertures or holes 27 are adapted to receive bolts 25 facing in one direction, and four bolt-mounting apertures 27 are adapted to receive bolts 25 facing in the opposite direction. As can be seen from FIG. 1., adjacent bolt mounting apertures 27 face in opposite directions, and they are preferably open radially outward to facilitate on-site assembly. However, apertures 27 which are closed about all 360° may also be used.

Both ends of the double-faced gland 13 are provided with annular sleeve-receiving slots 31. The annular slots 31 are each concentric with the central passageway 26 in the double-faced gland 13. Both slots 31 are spaced generally equally between the inner surface of the sleeve and the outer surface of the double-faced gland 13. Each slot 31 extends axially from one end surface of the double-faced gland 13 to an equal depth, and the double-faced gland is generally H-shaped in cross-section (see FIG. 2). The width of the slot 31, i.e., the distance between its cylindrical walls 35, allows each slot 31 to receive one of the deformable gaskets 17 and also to accommodate one end of each of the sleeves 21 in a manner to be described hereinafter in greater detail. The double-faced gland 13 is constructed of a suitable material, such as cast iron, which is rigid and will reasonably withstand corrosion. All other parts of the pipe coupling 11, except the deformable gaskets 17, are made of similar material.

The single-faced glands 15 are generally annular and have four bolt-receiving holes 36 uniformly spaced about their outer circumference. The single-faced gland 15 has a circumferential flange 37 which is concentric with the opening 39 through its interior. The flange 37 extends from what is herein termed the front surface of the single-faced gland. The opening 39 is slightly larger in diameter than the largest pipe of that size on which it is to be mounted so it will fit thereover. The flange 37 has an interior diameter approximately equal to the diameter of the outer wall 35 of the slot 31 in the gland 13 and likewise is adapted to receive one of the deformable gaskets 17 and one end of a sleeve 21.

The deformable gaskets 17 are ring-shaped and each has a cylindrical inner surface 40 and an outer surface portion 41 that is frusto-conical or generally wedged-shaped. The deformable gaskets 17 are correspondingly sized to fit within the slots 31 of the double-faced gland 15 and within the circumferential flange 37 of the single-faced glands 13. The gaskets 17 are preferably made from a suitable elastomer.

The extension sleeves 21 are generally tubular and have an inner diameter larger than the diameter of the pipe which the extension sleeve is to interconnect. The sleeve thickness is such to allow the end of the sleeve to fit within the slot 31 of the doubled-faced gland 13. The exterior surface of the sleeve 21 is preferably beveled slightly from both ends to facilitate easy entry into the glands. Moreover, each end of the sleeve 21 is internally chamfered to provide surface 45 which is designed to generally abut the frusto-conical surface portions 41 of the gaskets 17.

The bushings 23 are essentially large washers and are optionally employed when the outer diameter of the pipe 12a being repaired is relatively small. The outer diameter of the bushing 23 is proportioned to fit closely within the circumferential flange 37 of the single-faced gland 15. The bushing 23 has a central aperture 47 which is slightly larger than the pipe outer diameter. If the outer diameter of the pipe is close to the diameter of the single-faced gland opening 39, no bushing need be used. However, because of the variance in O.D. between the same size pipe whether made of cast iron, steel or asbestos cement, it is contemplated that a plurality of bushings 23 with different-sized apertures 47 would be provided. Alternatively, a bushing may be formed with a punch-out portion adjacent the aperture 47 to provide a larger diameter aperture upon its removal. The close fit between the bushing aperture 47 and the outer surface of the pipe 12 prevents the deformable gasket 17 from being extruded between the single-faced gland 15 and the pipe, which could otherwise occur when the opening 39 of the single-faced gland 15 is spaced too great a distance from the outer surface of the pipe 12.

Means for interconnecting the glands are provided in the form of the bolts 25 which are slightly longer than an extension sleeve 21 and which preferably have T-shaped heads so as not to interfere with their placement close to the outer surface of the sleeves 21. The bolts 25 are inserted through the holes 36 of the glands 15 and located in the bolt mounting apertures 27 of the double-faced gland 13. The nuts 24 are threaded onto the bolt ends and tightening draws the glands together.

As an example of the use of the illustrated pipe coupling 11, the broken portion is cut from the pipe leaving sections 12a and 12b. A single-faced gland 15 of the appropriate size is fitted onto the end of each of the spaced apart pipe sections 12a and 12b. The pipe sections need not be precisely aligned but may be somewhat out of alignment because the effectiveness of the illustrated pipe coupling 11 will not be impaired. Each of the single-faced glands 15 is positioned on its respective pipe end 51 to have its front end 15a face the other pipe end 51. With the single-faced glands 15 so positioned, when for example the pipe is made of steel and therefore relatively thin in wall thickness, a bushing 23 having an appropriately sized aperture 47 may be installed to insure a close fit around the outer surface of the pipe 12. A deformable gasket 17 is then positioned against each of the bushings 23, having its angled surface facing away from the end of the pipe 12. An extension sleeve 21 is then placed on each of the pipe ends, with the end of the sleeve located between the circumferential flange 37 and the frusto-conical surface 41 of the gasket 17.

A double-faced gland 13, with gaskets 17 inserted in both slots 31 is then placed on the free end of one of the sleeves 21. Four bolts 25 are then positioned in the respective bolt mounting holes 27 and 36, and nuts 24 are loosely tightened to cause the particular single-faced gland 15 to be drawn toward the double-faced gland 13. With one connection loosely made, the double-faced gland 13 is then aligned with the free end of the other sleeve 21, and four more bolts 25 are inserted and nuts 24 added. As all eight nuts 24 are thereafter tightened, the single-faced glands 15 move toward the double-faced gland 13 and the wedge-shaped ends of the sleeves 21 apply force across substantial surface areas of the deformable gaskets 17, forming tight seals between each end of the sleeves 21 and the outer surfaces of the pipe sections. Tightening of the nuts 26 is continued until the gaskets 17 are compressed to the desired extent to achieve fluid tight seals. The presence of the bushings 23 in the illustrated embodiment prevents extrusion of the gaskets and assures effectiveness of the seals.

Because there are two sets of bolts 27, each of which extends away from the double-faced gland 13 independently of the alignment of the other set, one set of bolts may be oriented at an angle to the other set of bolts without adversely affecting the sealing of the coupling. This is an important advantage when the break in the pipe being repaired was caused by stresses which have resulted in non-coaxial alignment of the remaining pipe sections 12a and 12b.

If the break is so extensive that the spacing of the ends of pipes 12a and 12b is too far for two sleeves 21 to fill the gap, an additional sleeve 21 and double-faced gland 13 may be used to interconnect the pipe ends. The single-faced glands 15 and sleeves 21 are positioned on the pipe ends 12a and 12b as previously described, but a double-faced gland 13 is then attached by bolts 25 and nuts 24 to each sleeve 21. The glands 15 and 13 are loosely tightened together as previously described, and an additional sleeve 21 is then connected between the two double-faced glands 13. Of course, even more sleeves 21 and double-faced glands 13 could be used if needed to make the repair connection without special bolts.

If it should be desired to cut a shut-off valve into the pipe line, such a valve can be used as a part of the pipe coupling 11 in place of one sleeve 21. In FIG. 4, a gate valve 55 is shown having ends which terminate in short unthreaded tubular sections having intermediate apertured flanges 57. Accordingly, the flow passageway portion of the gate valve 55 serves as a sleeve member, disposed between a single-faced gland 15 and the double-faced gland 13, in place of one sleeve 21.

Four shorter bolts 25a are utilized to connect the double-faced gland 13 to the apertured flange 57 on one end of the gate valve 55, and four more short bolts 25a also connect the flange 57 at the other end of the gate valve 55 to the single-faced gland 15. A gasket 17 is of course employed in each of the glands, and when the nuts on the ends of the bolts 25a are tightened, fluid tight seals are achieved at both ends of the gate valve 55 in the manner previously described.

The illustrated pipe coupling 11 utilizes the same major components to repair pipes of different sizes and which are made of different material. The single-faced gland 15 is made large enough to accommodate the largest outer diameter for pipe of a particular size, and bushings 23 of more than one size are provided for use in conjunction therewith if needed to adapt the same single-faced gland 15 to fit the smallest outer diameter pipe of that size. For the repair of longer breaks, additional sleeves 21 and double-faced glands 13 may be utilized to provide the necessary coupling length. If a shut-off valve is desired, a suitable valve can be substituted for one of the sleeves 21. Thus, when the repairman goes to the repair site, he need only carry one set of components even though he does not have forehand knowledge of the precise outer diameter size of the pipe to be repaired or the length of the break to be repaired. The repair work is made easier and the ultimate seal more effective by the fact that the sections of pipe to be coupled need not be coaxially aligned but may be slightly askew.

While one embodiment of the invention has been illustrated, various modifications may be made therein without departing from the spirit and scope of the invention which is defined by the appended claims. Various of the features of the present invention are set forth in the claims which follow.

What is claimed is:

1. A pipe coupling for interconnecting two spaced apart pipe sections, which coupling comprises a pair of sleeve members, said sleeve members each having an inner dimension larger than the outer diameter of the respective pipe section, one end of each of which sleeve members is adapted to circumscribe one end of the pipe sections to be interconnected, a double-faced gland for receiving the other end of each of said sleeve members, first means for forming a fluid tight seal between said double-faced gland and each of said sleeve ends, a pair of single-faced glands each adapted to circumscribe one of the pipe sections and to receive said one end of one of said sleeve members, second means for cooperating with each of said single-faced glands to form a fluid tight seal between said sleeve member and the pipe section circumscribed, and first and second connecting means for extending in generally opposite directions from said double-faced gland, each of said connecting means being adapted to urge one of said single-faced glands toward said double-faced gland and thereby retain one said sleeve member therebetween.

2. The pipe coupling of claim 1 wherein said first seal-forming means comprises deformable gasket means disposed in a recess provided in each face of said double-faced gland, said other end of one of said sleeve members being seated in each recess.

3. The pipe coupling of claim 2 wherein said recesses are provided by annular grooves of equal dimension and wherein said ends of said sleeve members are proportioned to be received in the radially outermost regions of said grooves.

4. The pipe coupling of claim 3 wherein said connecting means includes a plurality of bolts disposed radially outward of said sleeve members.

5. The pipe coupling of claim 1 wherein said second seal-forming means includes an annular deformable gasket for disposition intermediate the outer surface of the pipe section and said sleeve member.

6. The pipe coupling of claim 5 wherein each of said single-faced glands includes a circumferential flange portion proportioned to receive one end of one of said sleeve members and wherein said single-faced gland is adapted to bear laterally against said deformable annular gasket and force said gasket between said sleeve member and the pipe outer surface.

7. The pipe coupling of claim 6 wherein said single-faced gland has an opening therethrough of substantially larger diameter than the pipe outer surface and wherein an annular bushing having an aperture of a diameter close to the pipe outer surface diameter is disposed laterally between said gasket and said single-faced gland.

8. The pipe coupling of claim 5 wherein said sleeve members are provided with an interior chamfer at each end and wherein said gasket is provided with a frusto-conical surface which abuts said chamfer.

9. The pipe coupling of claim 1 wherein one of said sleeve members is the body portion of a shut-off valve.

10. The pipe coupling of claim 9 wherein said first connecting means comprises separate connectors adapted to secure one end of said valve to said double-faced gland and adapted to secure the other end of said valve to one of said single-faced glands.

* * * * *